(12) United States Patent
Jessup

(10) Patent No.: US 6,848,878 B2
(45) Date of Patent: Feb. 1, 2005

(54) TWO STAGE DUMPER APPARATUS AND METHOD

(75) Inventor: Richard J. Jessup, Bloomfield Hills, MI (US)

(73) Assignee: Jessup Engineering, Inc., Rochester Hills, MI (US)

( * ) Notice: Subject to any disclaimer, the term of this patent is extended or adjusted under 35 U.S.C. 154(b) by 92 days.

(21) Appl. No.: 10/359,000

(22) Filed: Feb. 5, 2003

(65) Prior Publication Data

US 2004/0151563 A1 Aug. 5, 2004

(51) Int. Cl.⁷ .............................................. B65G 65/23

(52) U.S. Cl. ...................... 414/420; 414/425; 414/810

(58) Field of Search ................................ 414/419–421, 414/425, 810

(56) References Cited

U.S. PATENT DOCUMENTS

| | | | | |
|---|---|---|---|---|
| 2,727,641 A | * | 12/1955 | Tomkins | 414/414 |
| 3,225,947 A | * | 12/1965 | Anderson | 414/421 |
| 3,717,270 A | * | 2/1973 | Rooke et al. | 414/414 |
| 5,302,073 A | * | 4/1994 | Riemersma et al. | 414/421 |
| 6,273,667 B2 | * | 8/2001 | Karpisek | 414/425 |

* cited by examiner

*Primary Examiner*—Thomas J. Brahan
(74) *Attorney, Agent, or Firm*—John R. Benefiel

(57) ABSTRACT

A dumper apparatus and method for transferring bulk parts from a parts container into a receptacle includes an outer hopper having a parts container cradle pivotally mounted therein. The hopper is swung up from an upright front end up position while the cradle is thereby also simultaneously pivoted thereby by a linkage from a horizontal position, causing the parts to be dumped from the container into the hopper and thence from the hopper into the receptacle as the hopper reaches a front end downwardly inclined position.

15 Claims, 5 Drawing Sheets

TWO STAGE DUMPER APPARATUS AND METHOD

BACKGROUND OF THE INVENTION

This invention concerns dumpers, typically used to transfer loose parts such as metal fasteners in bulk during various processing steps, particularly in metal finishing operations.

The parts are commonly transported in tote boxes which need to be emptied into an opening of a container used in processing the parts, such as a perforated barrel used in plating, phosphating, etc. Tote boxes are open topped sturdy boxes constructed of metal containers having a metal nose at the front end for directing parts emptied out of the tote box by being tipped forwardly. The filled tote boxes are usually too heavy for manual handling and transferring the contents of a dozen or more tote boxes per hour is typical in any given processing operation. This results in much time being consumed in handling the tote boxes using various lifts.

The parts must be transferred from the tote box into the barrel to begin the finishing process. This transfer can be by dumping the parts directly from the tote box into the barrel, or it can include an intermediate dumping from the tote box into other devices, from which the parts are then fed into the barrel. In either case, it is standard industry practice to use a conventional device called a tote box dumper to automatically dump the parts out of the tote box.

There are many different configurations of tote box dumpers available on the market from companies that specialize in material handling equipment, and their basic method of operation is the same. The tote box is loaded into the hopper of the tote box dumper, where it is constrained in either a passive manner by the configuration of the hopper, or in an active manner by some form of actuated device. The hopper is then rotated about a pivot point by some form of automation, usually hydraulic or electric, which causes the hopper and the tote box within it to be raised and pivoted, tilting the tote box forward in the process. As the tote box tilts forward the parts dump out of the tote box and onto the forward face of the hopper where they slide down toward the barrel opening. The system is always designed such that as the exit nose of the pivoting hopper approaches the opening of the barrel the parts that are sliding down the hopper face enter into the barrel. When the hopper rotates to its maximum practical angle, which is typically about 135°, the exit nose of the hopper protrudes into the opening of the barrel, and all of the parts have theoretically dumped out of the tote box and into the barrel. The tote box dumper then rotates and lowers the hopper and tote box back to their down position. The dumping process is also similar in the case when the material is being dumped into an intermediate device rather than directly into the barrel.

A traditional problem with this dumping process is that for many tote box loads some of the parts do not in fact leave the hopper and/or the tote box when they are dumped. While the magnitude of the problem is dependent on the geometry and quantity of the parts and the configuration of the tote box, it occurs for two primary reasons. First, parts will sometimes become trapped between the front of the tote box and the face of the hopper during the dump process, and then stay in the hopper when it returns to its down position. This happens because the tote box is placed directly up against the front face of the hopper, and when the parts start to dump out of the tote box, the hopper face is often not yet tilted far enough downward to cause the parts to slide toward the hopper exit nose, so the parts instead slide backward toward the bottom of the hopper and get trapped under the tote box. Even when a standoff is used to separate the tote box from the front face of the hopper, some parts can still get trapped. Second, parts will sometimes get caught around the rim or corners of the tote box itself, and then remain in the tote box when it returns to its down position.

For these reasons, the operator needs to continually monitor the dumping process and manually retrieve any parts that were not dumped. If the operator does not notice and remove the retained parts, they could become mixed with a following load of different parts, which then creates the problem of "part mixing" for the customer. In today's quality conscious world, the problem of part mixing has become very important, and a growing number of metal finishing customers are demanding "zero parts per million" mixed parts.

Some commercially available tote box dumpers address the part mixing problem by pivoting the hopper and tote box a full 180° instead of the typical 135°. This orients the tote box completely upside down, which makes it much less likely for any parts to remain in the tote box or to be trapped between the tote box and the hopper walls. Drawbacks to various versions of these dumpers are that they utilize a more complex dual-stage hydraulic mechanism to create the additional rotation, that they require adjustable tote box clamp mechanisms that can restrict part flow, that they require more valuable space above the barrel area, or that they use multiple linkage mechanisms which move the hopper in such a way that it cannot be used to feed the parts directly into a barrel mouth.

An object of the invention is to provide an apparatus and method for dumping loose parts ensuring that all of the parts can be dumped directly into a receiver and to thereby eliminate the problem of part mixing, while not requiring complex bulky apparatus, and tote box clamps.

SUMMARY OF THE INVENTION

These objects and others which will become apparent upon a reading of the following specification and claims are achieved by a two stage dumper apparatus including a hopper closed at the bottom and on three sides and open at the front. The hopper is initially vertically positioned with its rear end wall extending horizontally. A tote box cradle is provided, mounted within the hopper with clearance spaces between it and the hopper, shaped and sized to slidably receive a loaded tote box and locate it so that its nose projects forwardly at the front end of the tote box cradle. The tote box cradle is pivoted at its forward end to the sidewalls of the hopper so as to be suspended well above the bottom wall of the hopper to allow pivoting up of the rear end of the cradle and tote box. In their initial position, the cradle and tote box extend horizontally.

The hopper itself is pivoted to a fixed frame at its forward end by bearings disposed at the top of the hopper when in its initial position resting its rear end wall.

To carry out a dump, a lift drive pulls up the hopper rear end to swing the hopper upwardly about its pivot. A pair of angled link arms are each pivoted at one end to the fixed frame and their other ends are each pivoted to a cross tube mounted to top of the cradle, so that as the hopper is swung up, the cradle (and the tote box received therein) is simultaneously tilted about is forward end pivot, at a greater rate than the hopper due to the link arm geometry. As the tote box approaches a vertical position, it begins to dump its contents into the hopper which is positioned below the tote box with its end wall extending up to thereby confine the parts dumped from the tote box within the hopper which slide to the rear of the upwardly inclined hopper.

As upward swinging of the hopper continues, the tilting of the cradle and tote box also continues, until the tote box is completely inverted and the hopper has its forward open end inclined downwardly and received into a receptacle opening so that the parts dumped in the hopper now slide out of the forward end of the hopper and into the receptacle opening.

Any parts remaining in the hopper can be discharged by repeating the final motion of the hopper from a partially retracted position.

Thereafter, the hopper and tote box cradle are both moved back to their initial position by lowering of the hopper preparatory to loading another filled tote box into the cradle.

DETAILED DESCRIPTION

Figure 1:
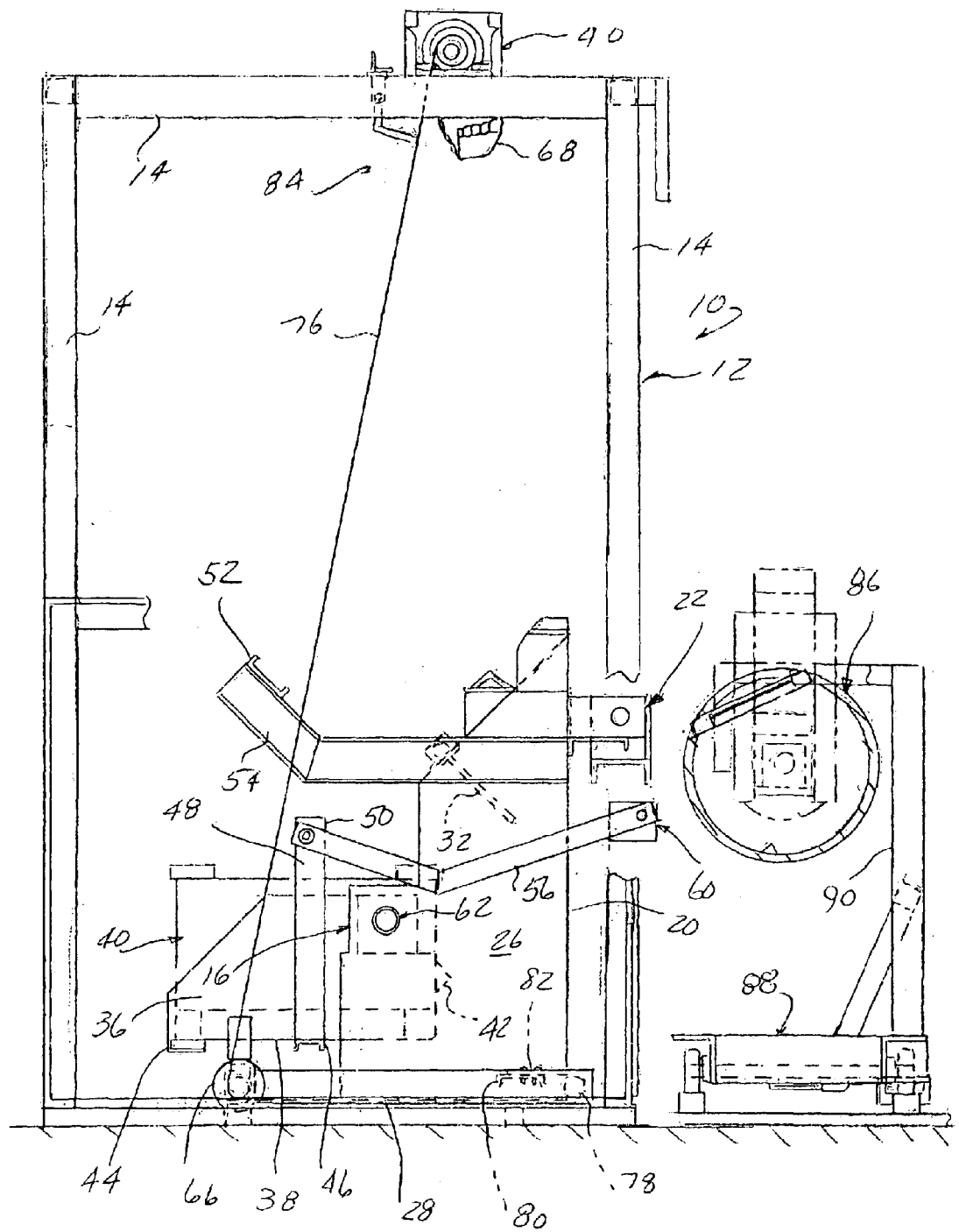
FIG. 1 is a side elevational view of a dumper apparatus according to the invention, shown next to a perforated barrel receptacle positioned to receive parts.
Figure 1A:
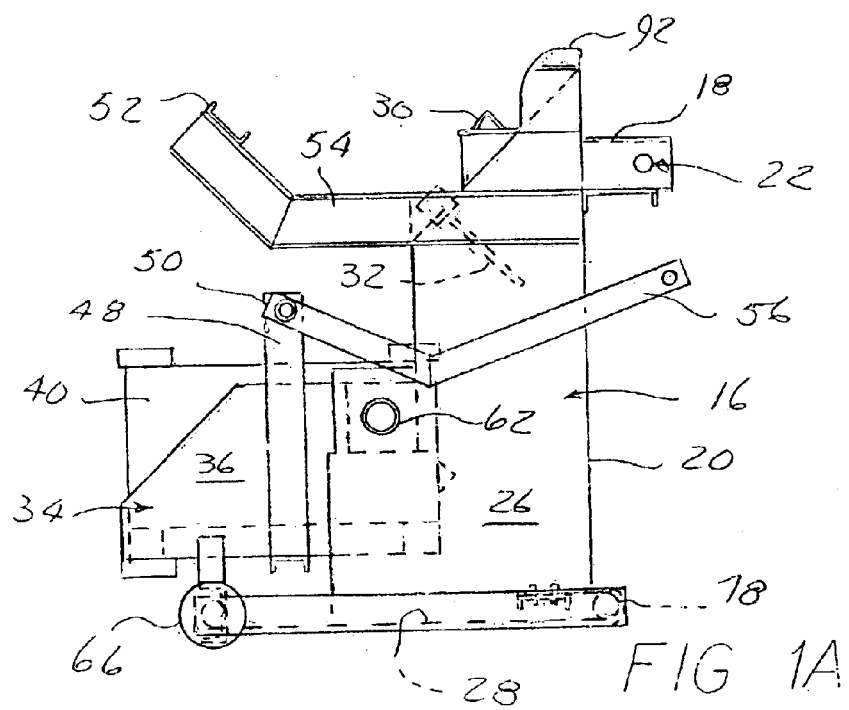
FIG. 1A is a simplified side elevational view of some of the major components shown in FIG. 1.
Figure 3:
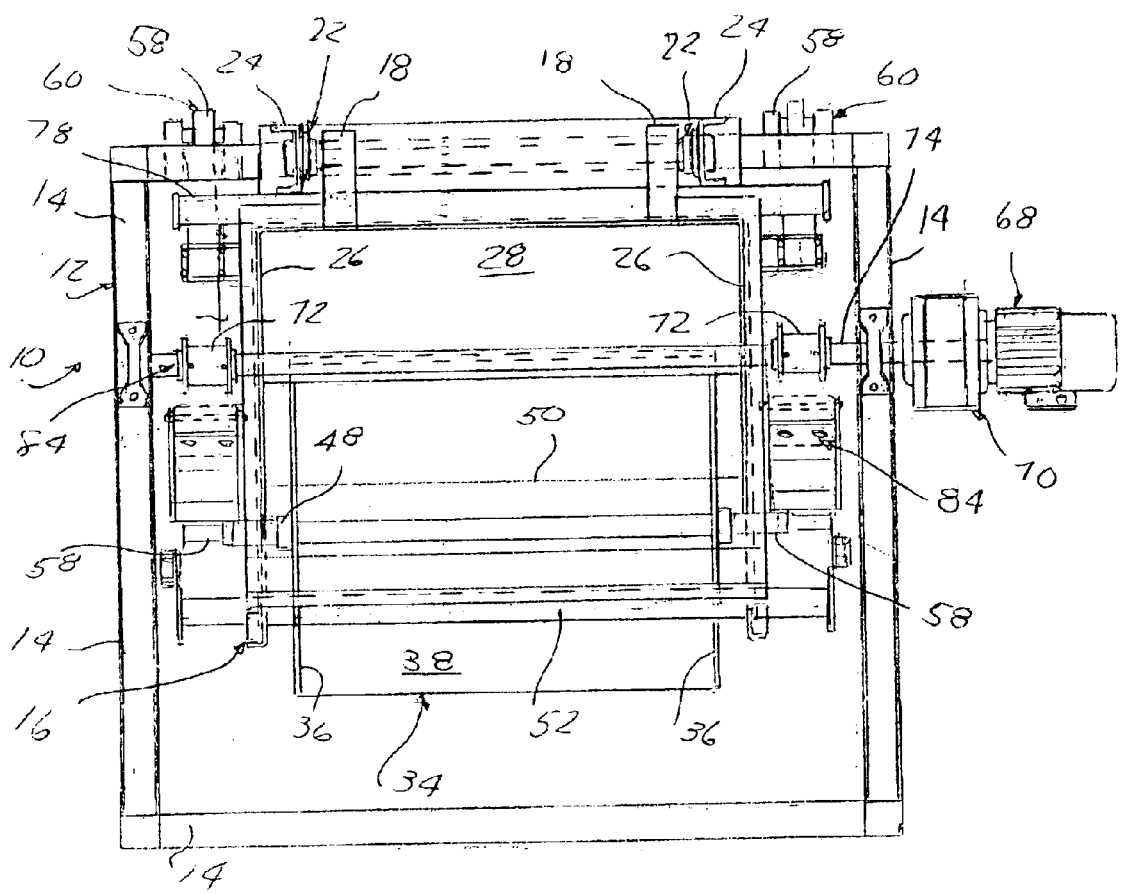
FIG. 3 is a plan view of the apparatus shown in FIGS. 1 and 2.
Figure 2:
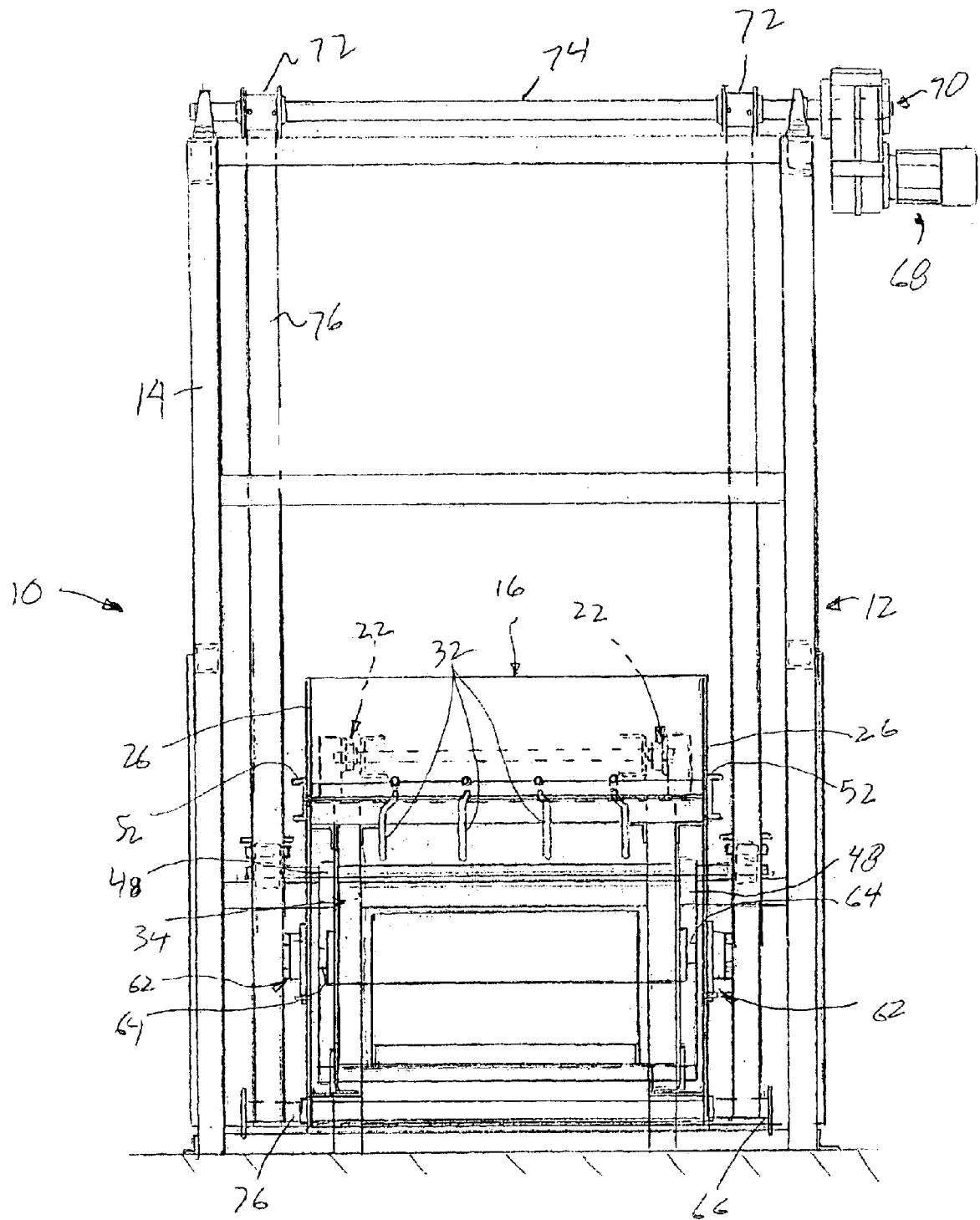
FIG. 2 is a front elevational view of the apparatus shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the dumping apparatus 10 includes a fixed support frame 12 constructed from box members 14 as by welding.

A hopper 16 is pivotally connected to the support frame 12 by members 18 welded to the forward position of the bottom plate 20, each extending to a respective bearing 22 mounted to upright channel frame members 24. The hopper 16 is shown in its initial or start vertical position, with its forward end up and a bottom plate 20 extending vertically.

The bottom plate 20 and a pair of sidewalls 26 and a rear end wall 28 create an open topped rectangular enclosure. While the forward end of the hopper 16 is substantially open, a part flow control cross bar 30 is provided as well as optional fingers 32 for orienting long parts so as to prevent tangles.

A tote box cradle 34 is comprised of two sides 36 and a bottom wall 38 and a front wall 42 forming a box open at a rear side able to receive a parts container comprised of a tote box 40, slid forwardly against the front wall 42 comprising a front stop allowing the cradle 34 to retain the tote box 40 therein as the cradle 34 is swung up from its initial horizontal position.

A pair of upright members 48 are welded to the cradle sides 36, with a cross tube member 50 extending therebetween which also serves to retain the tote box 40 loaded into the cradle 34 when the cradle 34 is swung up to be inverted as described below.

The tote box 40 in the cradle 34 is also retained therein when the cradle 34 is inverted by a cross channel beam member 52 fixed at either end to the upper ends of the pair of angled reinforcing members 54 affixed to respective sides 26 of the hopper 16.

A pair of angled linkage arms 56 are disposed straddling the outside of the hopper side walls 26, each linkage arm 56 affixed at one end to an axle shaft 58 extending within the cross tube 50. The other end of each angled linkage arm 56 has a pivot connection 60 to the frame 12.

The cradle 34 is pivotally mounted to the hopper 16 by bearing assemblies 62 mounted to either hopper side wall 26 receiving axles 64 on the cradle 34 sidewalls. This mounts the cradle 34 to allow the cradle to be swung up within the hopper 16 in the same lengthwise direction as the tilting motion of the hopper 16.

As shown in the drawings, the cradle 34 and hopper 16 are configured and located with respect to each other so that a substantial clearance space is defined between their respective side walls and bottom which allows for relative swinging movement of the cradle 34 within the hopper 16 and also provides space for receiving parts P without creating any interference to the swing.

The hopper 16 has a pair of belt idler spools 66 mounted at the left of the rear wall 28 (again, located at the bottom in FIG. 1). An electric drive motor 68 and reducer 70 drives a shaft 74 on which are mounted a pair of wind up reels 72 which have respective polyester belts 76 which extend around a respective idler spool 66, beneath the hopper 16, around a tube 78 and each terminating beneath a respective clamping plate 82 which is fastened to a respective fixed channel piece 80.

A conventional belt slack detection mechanism 84 is associated with each belt 76.

In operation, a tote box 40 loaded with loose parts is placed in the cradle 34.

A receptacle, such as the perforated plating barrel 86 is shown moved into position forward of the apparatus 10 in FIG. 1 as by operation of a drive 88 on a support dolly 90 of conventional design.

Figure 4:
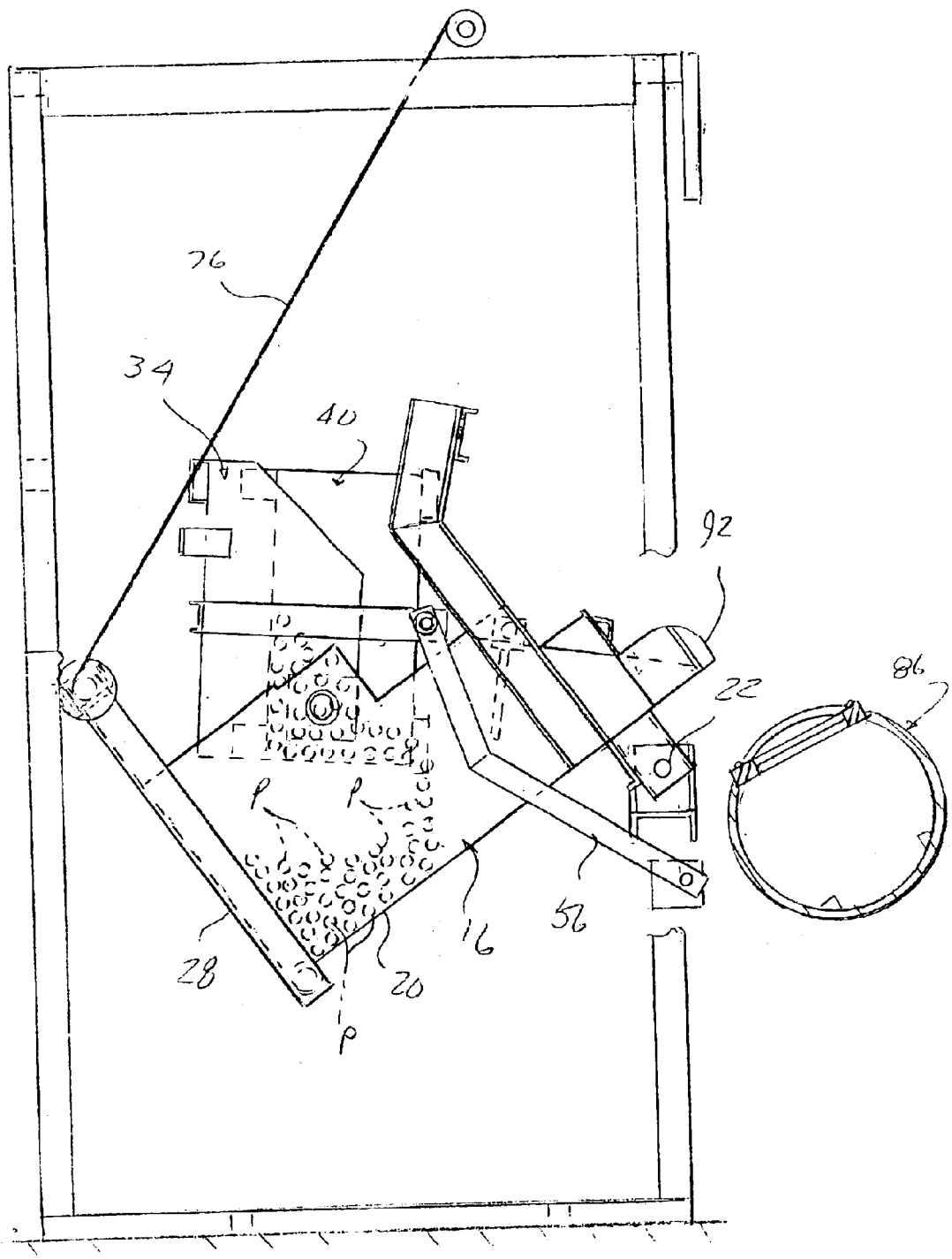
FIG. 4 is a simplified side elevational view of the apparatus in the partially raised position of the hopper and tote box cradle with parts dumping from a tote box into the hopper.

The belts 76 are wound up by operation of the motor 68 and reducer 70, raising the hopper 16 up about the pivot 22, the now inclined rear wall 28 and bottom wall 20 forming a collecting space as the hopper 16 swings to the intermediate position shown in FIG. 4.

The cradle 34, due to the constraining action of the linkage arms 56 is at the same time swung up to a greater extent, reaching a vertical orientation before the hopper 16 reaches a horizontal position as it is swung up, causing the parts P to be discharged out of the tote box 40 and collected in the rear collecting space defined by the now inclined rear wall 28 and the bottom plate 20 of the hopper 16.

Figure 5:
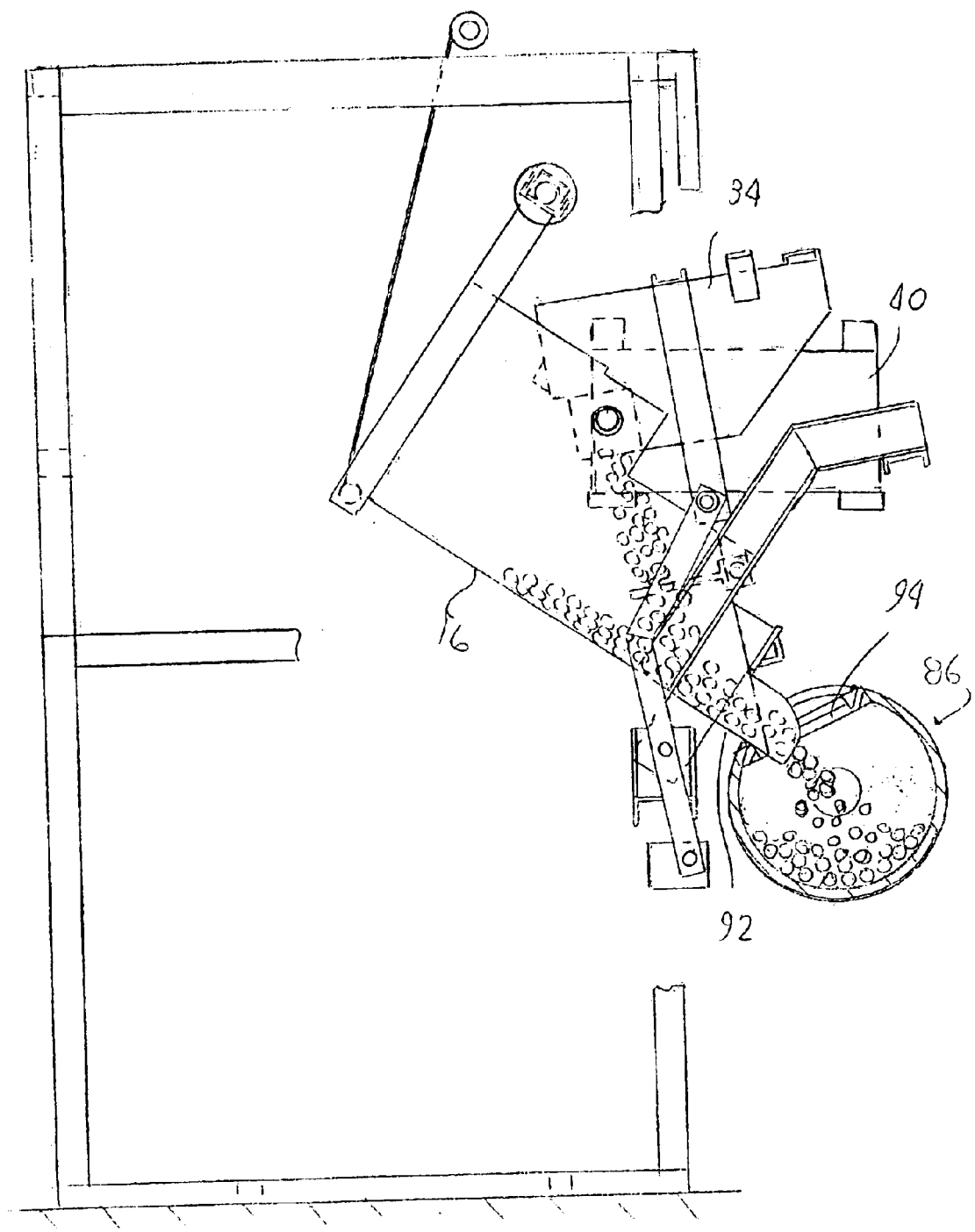
FIG. 5 is a side elevational view of the apparatus in the fully raised position, dumping parts into the receiving barrel.

Upon continued wind up of the belts 76, the hopper 16 is swung through a horizontal position to a downwardly inclined front end orientation shown in FIG. 5.

The hopper 16 has a discharge guide 92 which is moved into an aligned opening 94 in the receptacle barrel 86, and parts P are gravity discharged from the hopper 16 into the barrel 86.

The cradle 34 is substantially inverted, causing the tote box 40 to fall against the cross tube member 50 and cross beam member 52, causing the remaining parts P to be completely discharged into the hopper 16, which funnels the same into the barrel 86.

If parts P remain in the hopper 16 after being swung up, the operator can relower the hopper 16 to obtain complete clearing of the parts P.

The different degree of movement of the hopper 16 and cradle 34 and their separation precludes any chance that parts can become wedged between these components.

Only a single actuator is required such that the drive is relatively simple and reliable. The electric motor and belt drive could also be carried out with hydraulic actuators.

What is claimed is:

1. A dumper apparatus comprising:

a support frame;

an open topped hopper having side walls a bottom wall, and a rear end wall, an open forward end of said hopper being mounted to said frame through a pivot so as to be oriented in an initial upright position with said rear end wall disposed horizontally;

an actuator selectively operable to swing said hopper up about said pivot through a horizontal position to a downwardly inclined position of said forward end;

a cradle mounted within said hopper, said cradle configured to be able to receive a loaded open topped parts container from a rear end thereof and retain said parts container therein as said cradle is moved from an initial generally horizontal position to an inverted position; said cradle being pivotally mounted within said hopper with a clearance therebetween allowing said cradle to be swung up within said hopper in the same direction as said hopper swinging motion;

a linkage pivotally connected to said cradle and said support frame causing said cradle to be swung up from an initial substantially horizontal position when said hopper is in said initial position, through a vertical position to a substantially inverted position as said hopper reaches a downwardly inclined position, whereby a loaded parts container in said cradle is tipped and then inverted to discharge parts therein into said hopper, said parts then discharged from said downwardly inclined hopper.

2. The dumper apparatus according to claim 1 wherein said linkage includes a pair of link arms each pivoted at one end to said support frame and at an opposite end pivotally connected to said cradle.

3. The dumper apparatus according to claim 2 wherein each of said link arms are located along the outside of said hopper, and said link arms connected to said cradle by a pivoted shaft mounted to said cradle out extending across said cradle and said hopper, with each of said link arms having opposite ends connected to a respective end of said shaft.

4. The dumper apparatus according to claim 3 wherein said shaft extends within a cross tube member affixed to said cradle to be located above a parts container positioned in said cradle to restrain movement thereof out of said cradle when said cradle is inverted.

5. The dumper apparatus according to claim 1 wherein said cradle is pivotally mounted to said hopper side walls.

6. The dumper apparatus according to claim 1 wherein said actuator comprises a drive motor and a shaft driven thereby, a pair of wind up reels on said shaft, each having a belt attached thereto to be wound up when said shaft is driven in one direction by said motor, said belts each also attached to said hopper to cause said upward swinging motion as said belts are wound on said reels.

7. The dumper apparatus according to claim 1 further including a pair of members affixed to said hopper to extend above the sides thereof with a cross beam member fixed to upper ends thereof to extending across said hopper, said cross beam member located to be engaged by a parts container after inversion thereof by inversion of said cradle to limit movement of said parts container out of said cradle.

8. The dumper apparatus according to claim 1 further including a receiving receptacle positionable adjacent said support frame, and wherein said hopper has a discharge guide at said forward end protruding out of said support frame as said hopper is swung to said downwardly inclined orientation to be able to be brought into registry with an opening in said receiving receptacle when positioned adjacent said support frame.

9. The dumper apparatus according to claim 8 wherein said receiving receptacle comprises a perforated plating barrel having an opening in a side wall thereof able to be aligned with said hopper discharge guide when positioned adjacent said support frame.

10. A method of dumping parts from an open topped parts container into an opening in a parts receiving receptacle, said method comprising the steps of pivotally mounting a parts container receiving cradle within a larger open topped hopper having two sides, and a rear wall and a front end discharge opening for discharging parts from said hopper upon downwardly inclining said front end of said hopper;

initially positioning said hopper in a front end up position with said cradle extending generally horizontally within said hopper but spaced from said side walls, bottom and end wall to define a clearance space therebetween to enable relative movement therebetween:

loading said parts container into said cradle;

raising said rear wall end of said hopper to swing said hopper through a horizontal position to said front end downwardly inclined position, said discharge opening aligned with said receptacle opening in said downwardly inclined position;

simultaneously swinging said cradle up through a vertical position to reach a substantially inverted position as said hopper reaches said front end downwardly inclined position, retaining said parts container to be held in said cradle as said cradle is swung to said inverted position, parts from said container being thereby dumped out of said container and into said hopper and thereafter being slid out of said hopper through said front end discharge opening of said hopper and into said receptacle.

11. The method according to claim 10 wherein said step of pivoting said cradle during swinging of said hopper comprises the step of pivotally connecting one or more swing arms to said cradle and to a fixed structure so as to induce said pivoting of said cradle by said hopper swinging motion.

12. The method according to claim 11 wherein said step of swinging said hopper includes the steps of pivotally mounting said hopper front end to a fixed structure and lifting said end wall to cause said swinging of said hopper.

13. The method according to claim 10 further including the step of retaining said parts container within said cradle as said cradle is swung to an inverted position.

14. The method according to claim 10 including the step of angling said rear wall up when said parts container gets tipped sufficiently to discharge parts to confine said first discharged parts in a confining space defined by said hopper bottom and end wall.

15. The method according to claim 10 wherein said cradle is swung up at a greater rate than said hopper to reach a substantially vertical position well before said hopper reaches a horizontal position during its swinging motion.

* * * * *